(12) United States Patent
Lindberg et al.

(10) Patent No.: US 11,554,817 B2
(45) Date of Patent: Jan. 17, 2023

(54) ACTIVE AERODYNAMICS LIFTGATE SPOILER DESIGN WITH MULTI 4 BAR KINEMATIC LINKAGES

(71) Applicant: Magna Exteriors Inc., Concord (CA)

(72) Inventors: Braendon R. Lindberg, Metamora, MI (US); Michael Cowan, Macomb, MI (US); Martin R. Matthews, Troy, MI (US); Anthony J. Povinelli, Romeo, MI (US); Larry Erickson, Birmingham, MI (US); Michael Mcafee, Rochester Hills, MI (US)

(73) Assignee: MAGNA EXTERIORS, INC., Concord (CA)

( * ) Notice: Subject to any disclaimer, the term of this patent is extended or adjusted under 35 U.S.C. 154(b) by 27 days.

(21) Appl. No.: 17/252,344

(22) PCT Filed: Jun. 18, 2019

(86) PCT No.: PCT/US2019/037740
§ 371 (c)(1),
(2) Date: Dec. 15, 2020

(87) PCT Pub. No.: WO2019/246103
PCT Pub. Date: Dec. 26, 2019

(65) Prior Publication Data
US 2021/0269102 A1    Sep. 2, 2021

Related U.S. Application Data

(60) Provisional application No. 62/795,319, filed on Jan. 22, 2019, provisional application No. 62/686,271, filed on Jun. 18, 2018.

(51) Int. Cl.
*B62D 35/00*    (2006.01)
*B62D 37/02*    (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS 9,567,015 B2    2/2017  Wolf et al.
10,099,730 B1*  10/2018 Williams ............... B62D 37/02
(Continued)

FOREIGN PATENT DOCUMENTS

DE    102016105994 A1    10/2017
FR      2972994 A1        9/2012
(Continued)

OTHER PUBLICATIONS

Notification of Transmittal of the International Search Report and the Written Opinion of the International Searching Authority for International Application No. PCT/US2019/037740, dated Oct. 10, 2019.

*Primary Examiner* — Lori L Lyjak
(74) *Attorney, Agent, or Firm* — Warn Partners, P.C.

(57) ABSTRACT

An active liftgate spoiler (10;100;200;300;400) used on a liftgate (8) of a vehicle (6). The liftgate has an upper surface (4) and is typically a rear liftgate or hatch on the rear side of the vehicle. A housing (11;104;202;302;412) is connected to the upper surface of the liftgate. There is a moveable panel (12; 102;204, 208; 306, 308;402,403) connected to the housing using a connection. The connection is formed by a four bar linkage (20,20'; 106, 106';210,210'; 311,311';411, 411') that forms a portion of the connection between the moveable panel and the housing. An actuator (14;110;212; 314;414), which in one embodiment is a single rotary (Continued)

actuator is connected to the four bar linkage and causes the movement of the moveable panel.

17 Claims, 7 Drawing Sheets

(56) References Cited

U.S. PATENT DOCUMENTS

| | | | |
|---|---|---|---|
| 2008/0179914 A1 | 7/2008 | Wegener | |
| 2013/0076064 A1* | 3/2013 | Smith | B62D 35/007 |
| | | | 296/180.1 |
| 2015/0375809 A1 | 12/2015 | Yuasa et al. | |
| 2018/0370581 A1* | 12/2018 | Williams | B62D 37/02 |

FOREIGN PATENT DOCUMENTS

| | | |
|---|---|---|
| FR | 3059964 A1 | 6/2018 |
| WO | 2019043199 A1 | 3/2019 |

* cited by examiner

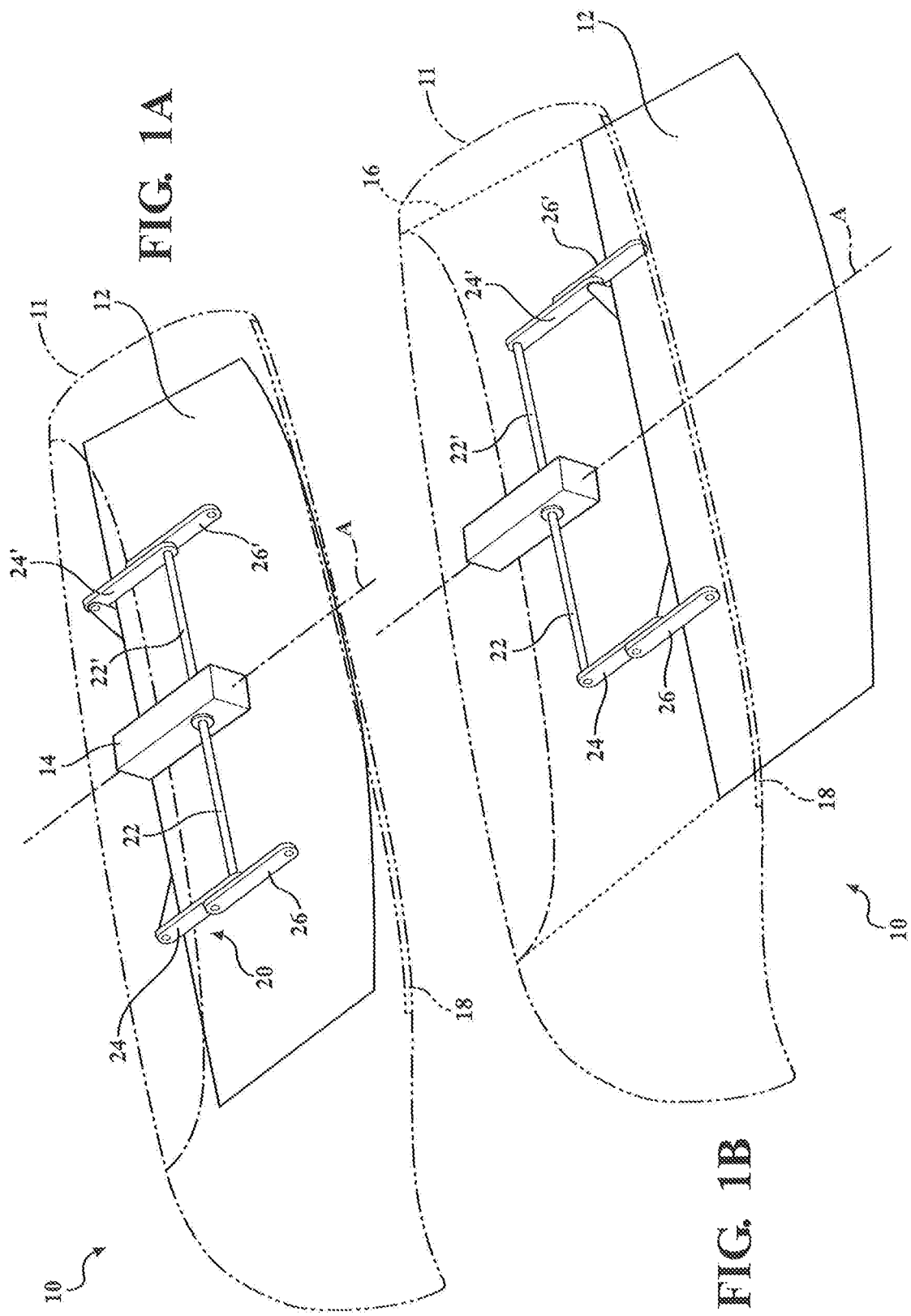

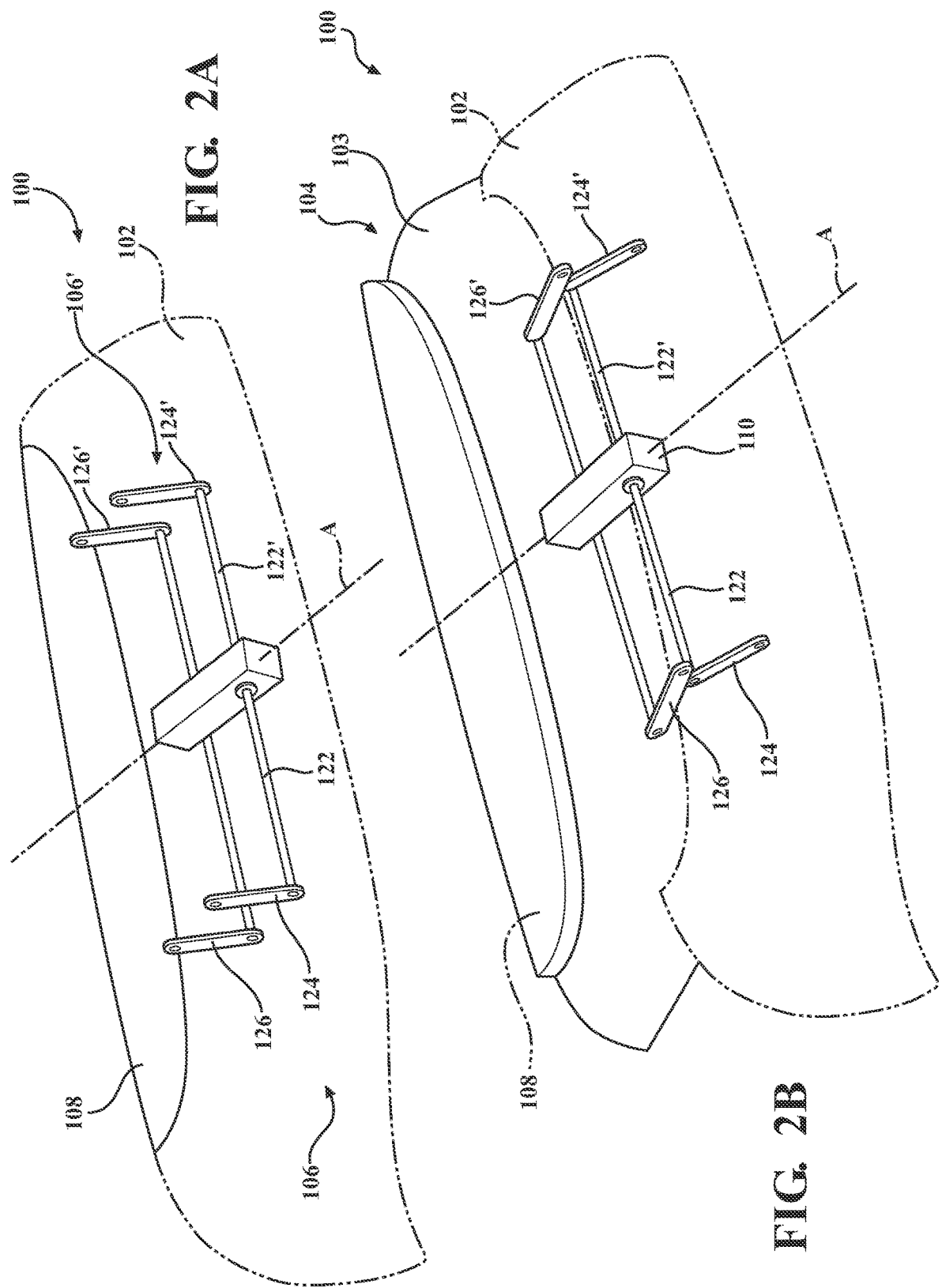

ACTIVE AERODYNAMICS LIFTGATE SPOILER DESIGN WITH MULTI 4 BAR KINEMATIC LINKAGES

CROSS-REFERENCE TO RELATED APPLICATIONS

This application is a National Stage Utility Application under 35 USC 371 claiming priority to PCT International Application PCT/US19/037740, filed Jun. 18, 2019, claims the benefit of U.S. Provisional Application No. 62/795,319, filed Jan. 22, 2019 and U.S. Provisional Application No. 62/686,271, filed Jun. 18, 2018. The disclosures are incorporated herein by reference.

FIELD OF THE INVENTION

The present invention relates to an active aerodynamic liftgate spoiler design with multi 4 bar kinematic linkages.

BACKGROUND OF THE INVENTION

"Spoilers" are known for use in vehicles for providing aerodynamic and styling benefits to various vehicles. In SUV type vehicles the spoiler is typically provided at the upper liftgate area wherein it is either attached to the roof or to the top of the liftgate of this type of vehicle.

The use of spoilers on SUV type vehicles reduces turbulent wake at the back area of SUV's thereby reducing coefficient of drag (Cd) and improving fuel economy. Static rear spoilers have been implemented to reduce drag but do not provide any adjustability due to their static nature. The present invention seeks to provide an active rear horizontal spoiler used in combination with a static rear spoiler to create a dimensionally adjustable horizontal flow passage with added benefits. The present invention also seeks to provide additional vertical flow passages created by active vertical spoilers, in combination with an active horizontal spoiler provides further added aerodynamic benefits.

Existing liftgate spoilers are mostly static and must achieve both stopped and traveling requirements as well as a singular balance between styling and performance. Movement of spoiler surfaces is limited due to package constraint. On surfaces where an active spoiler is used, the spoilers often use linear actuators to articulate surfaces but require package space that is often limited due to liftgate geometry and motion. It is an objective of the present invention to design a linkage system that allows for multi directional movement of liftgate surfaces. A system of an actuator and linkage(s) to move panels outward or inward of the vehicle and a separate set of actuators and links to move the system rearward or forward in vehicle. Linkage design allows for rotation of an actuator to move two or four bar kinematic linkages to move pieces of the liftgate spoiler in various directions. The motion achieved is a "lifting and placing" motion which reduces relative motion between the various surfaces, some of which are "Class A" or visible. This reduces friction and wear of components as motion is only rotational.

SUMMARY OF THE INVENTION

The present invention relates to an active liftgate spoiler used on a liftgate of a vehicle. The liftgate has an upper surface and is typically a rear liftgate or hatch on the rear side of the vehicle. A housing is connected to the upper surface of the liftgate. There is a moveable panel connected to the housing using a connection. The connection is formed by a four bar linkage that forms a portion of the connection between the moveable panel and the housing. An actuator, which in one embodiment is a single rotary actuator is connected to the four bar linkage and causes the movement of the moveable panel. In embodiments where more than one moveable panel is used, some embodiments use a single actuator to move multiple panels, while other embodiments use multiple actuators to move each panel.

BRIEF DESCRIPTION OF THE DRAWINGS

The present invention will become more fully understood from the detailed description and the accompanying drawings, wherein:

FIG. 1A is an overhead perspective view of an active liftgate spoiler having a moveable panel in the stowed position according to a first embodiment of the invention.

FIG. 1B is an overhead perspective view of a liftgate spoiler having a moveable panel in the deployed position according to a first embodiment of the invention.

FIG. 2A is an overhead perspective view of an active liftgate spoiler having an upper tray with linkage in the stowed position according to a second embodiment of the invention.

FIG. 2B is an overhead perspective view of an active liftgate spoiler having an upper tray with linkage in the deployed position according to a second embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

The present invention includes several embodiments having various moveable panel configurations which will now be described below. It is within the scope of the invention for the various embodiments to be used individually or in combination with each other depending on a particular application.

Figure 1:
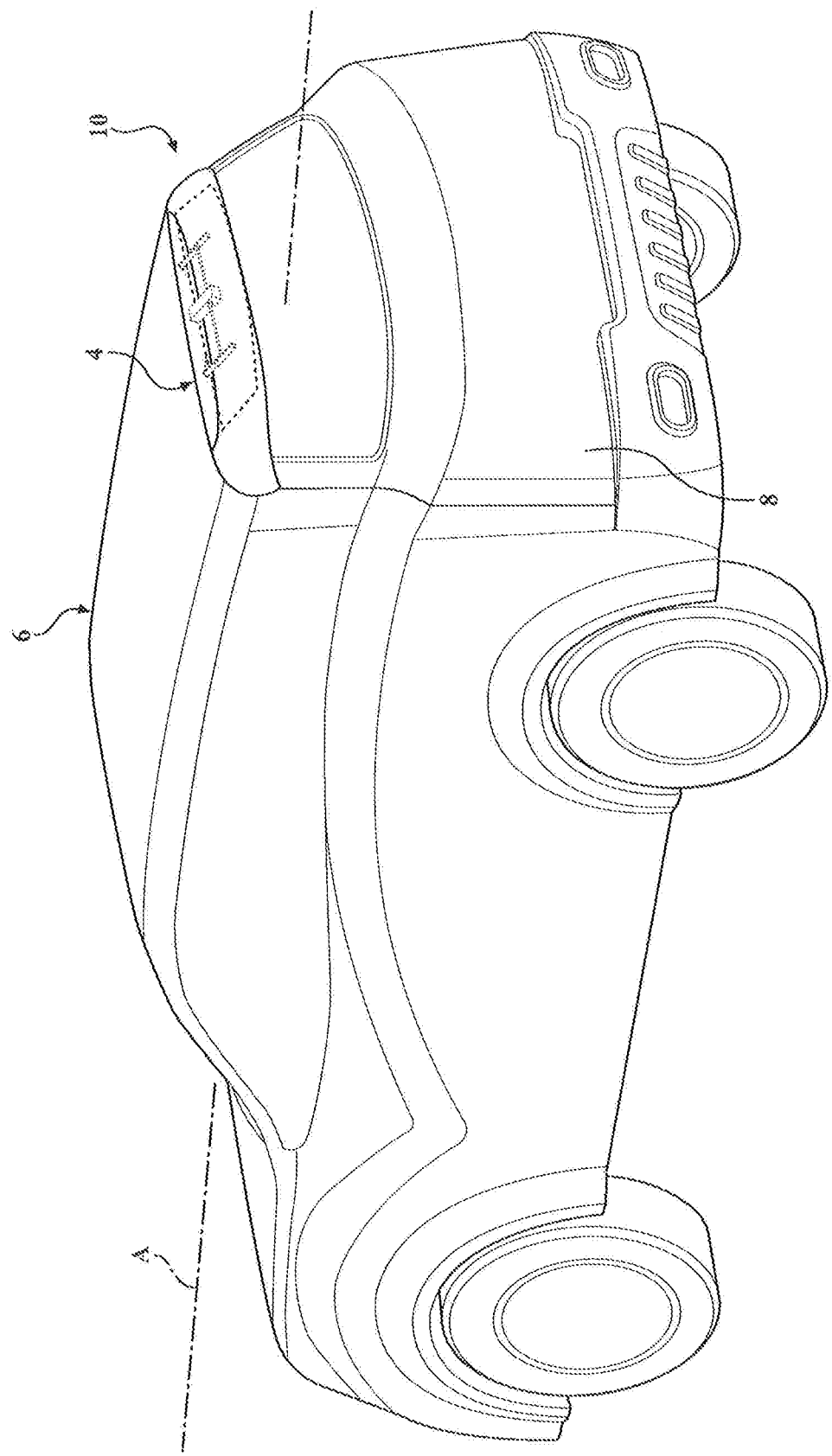
FIG. 1 is a side perspective view of the an active spoiler on a liftgate of a vehicle.

Referring now FIGS. 1, 1A and 1B show a first embodiment of the invention which includes an overhead perspective view of an active liftgate spoiler 10 having a lower panel 12 capable of sliding within a hollow cavity 16 of the active liftgate spoiler 10. The active liftgate spoiler 10 is connected to or formed as part of a liftgate 8 of a vehicle 6. More specifically the active liftgate spoiler 10 is connected or formed at an upper surface 4 of the liftgate 8. The vehicle 6 has a longitudinal axis A that the different moveable components of the invention move with respect to. While the upper surface 4, vehicle 6, and active liftgate spoiler 10 are shown only in FIGS. 1A and 1B it is within to be understood that all other liftgate spoilers described in the other embodiments of the invention connect to or are formed with the liftgate used on the vehicle at the same locations show in FIGS. 1A and 1B.

Referring specifically to FIGS. 1A and 1B the active liftgate spoiler 10 has a housing 11 with an opening 18 in the active liftgate spoiler 10 for slidably receiving the movable panel 12. The hollow cavity 16 is connected to the opening 18 of the active liftgate spoiler 10 and the movable panel 12 is contained within the hollow cavity 16 when in the stowed position. When the moveable panel 12 is moved to the deployed position as shown in FIG. 1B the moveable panel 12 extends through the opening 18 so that the movable panel 18 extends away from the active liftgate spoiler 10 when moved to the intermediate position and a deployed position. The moveable panel 12 moves by the movement of an actuator 14, which is a bi-directional rotary actuator that is connected to a four bar linkage 20, 20'. The four bar linkage 20, 20' has a drive shaft 22, 22', which is connected to a driven link 24, 24' connected at one end to the drive shaft 22, 22' and at a second end to the moveable panel 12. There is also a follower link 26, 26' that connects at a first end to an inside surface of the hollow cavity 16 of the active liftgate spoiler 10 and at a second end the follower link 26, 26' is connected to the moveable panel 12. The four bar linkage 20, 20' allows the moveable panel 12 to be moved between the stowed position, deployed position and an intermediate position between the stowed position and the deployed position. In some application it is possible for there to be more than one intermediate position, since the actuator 14 can rotate and stop the drive shaft 22, 22' at many different positions. To move between positions the actuator 14 rotates the drive shaft 22, 22' in a first direction until it reaches a desired intermediate position or the deployed position. Then the actuator 14 is rotated in a second direction opposite the first direction to move the moveable panel 12 from the deployed position or intermediate position back to the stowed position.

Referring now to the Figures, FIGS. 2A and 2B show a second embodiment of the invention which includes an overhead perspective view of an active liftgate spoiler 100 having an upper tray 102 connected to a mating surface 103 of a lower housing 104 of the active liftgate spoiler 100. The upper tray 102 moves between the stowed position where the upper tray 102 is seated against the mating surface 103 of the lower housing 104 and the deployed position where the upper tray 102 extends away from the lower housing 104. There is also an intermediate position between the stowed position and the deployed position. In this particular embodiment of the invention a four bar linkage 106, 106' raises the upper tray 102 off of the mating surface 103 of the lower housing 104 and then lowers the upper tray 102 downward to the deployed position, thereby eliminating any sliding connection between the upper tray 102 and the lower housing 104. The lower housing 104 also includes an external surface portion 108 adjacent the mating surface that the upper tray 102 rests against when moved to the stowed position. The external surface portion 108 provides a vertical edge on the housing 104 that the upper tray 102 will contact to create a uniform surface of the active liftgate spoiler when the upper tray 102 is in the stowed position and provides an aerodynamic benefit since there is no gap between the upper tray 102 and the housing 104 when the upper tray 102 is stowed.

The upper tray 102 moves by the movement of an actuator 110, which is a bi-directional rotary actuator that is connected to the four bar linkage 106, 106'. The four bar linkage 106, 106' has a drive shaft 122, 122', which is connected to a driven link 124, 124' connected at one end to the drive shaft 122, 122' and at a second end to the upper tray 102. There is also a follower link 126, 126' that connects at a first end to the lower housing 104, and at a second end the follower link 126, 126' is connected to the upper tray 102. The four bar linkage 106, 106' allows the upper tray 102 to be moved between the stowed position, deployed position and an intermediate position between the stowed position and the deployed position. In some applications it is possible for there to be more than one intermediate position, since the actuator 110 can rotate and stop the drive shaft 122, 122' at many different positions. To move between positions the actuator 110 rotates the drive shaft 122, 122' in a first direction until it reaches a desired intermediate position or the deployed position. Then the actuator 110 is rotated in a second direction opposite the first direction to move the upper tray 102 from the deployed position or intermediate position, back to the stowed position.

Figure 3A:
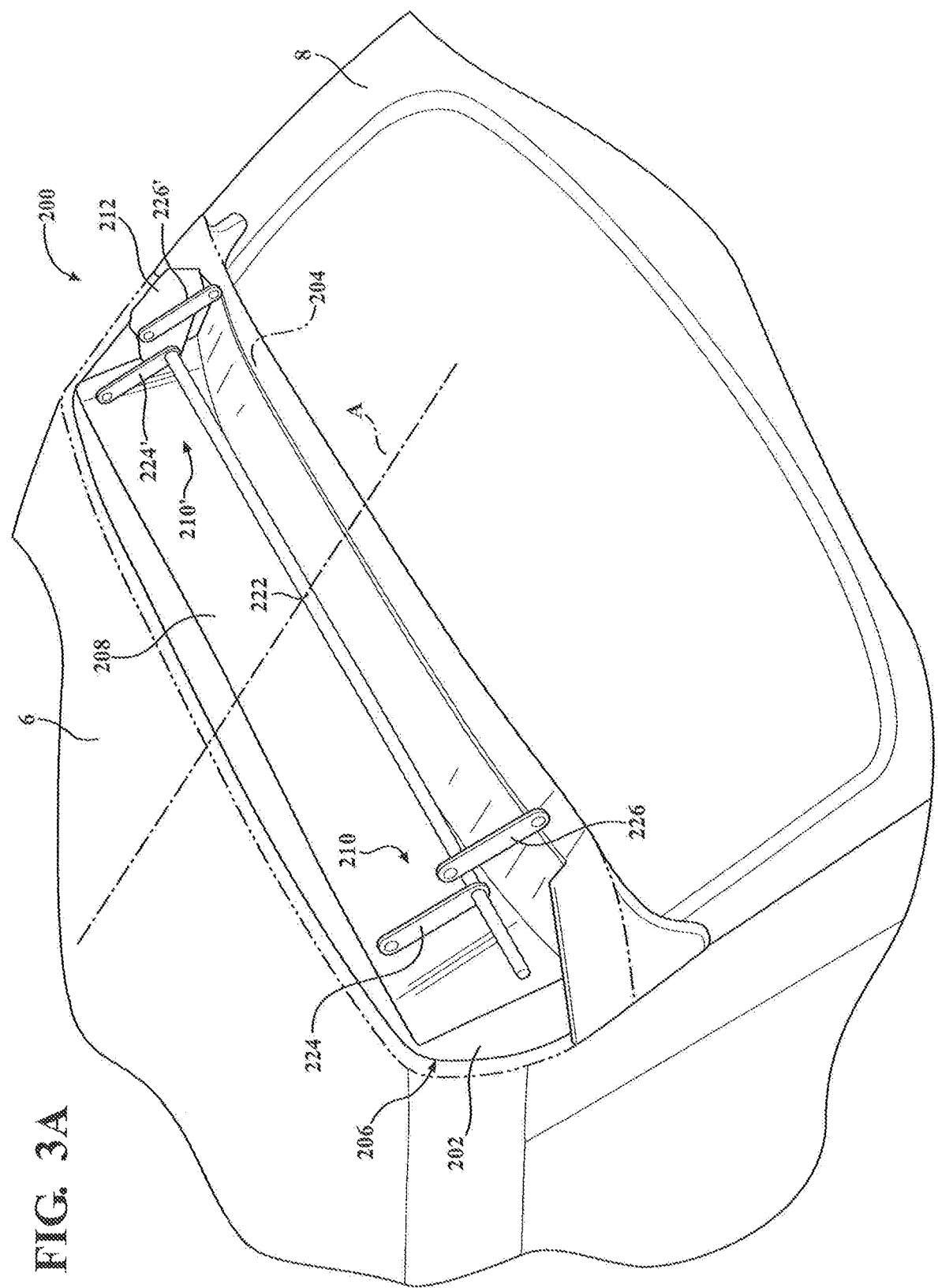
FIG. 3A is an overhead perspective view of an active liftgate spoiler having an active vertical spoiler shown in the stowed position according to a third embodiment of the invention.
Figure 3B:
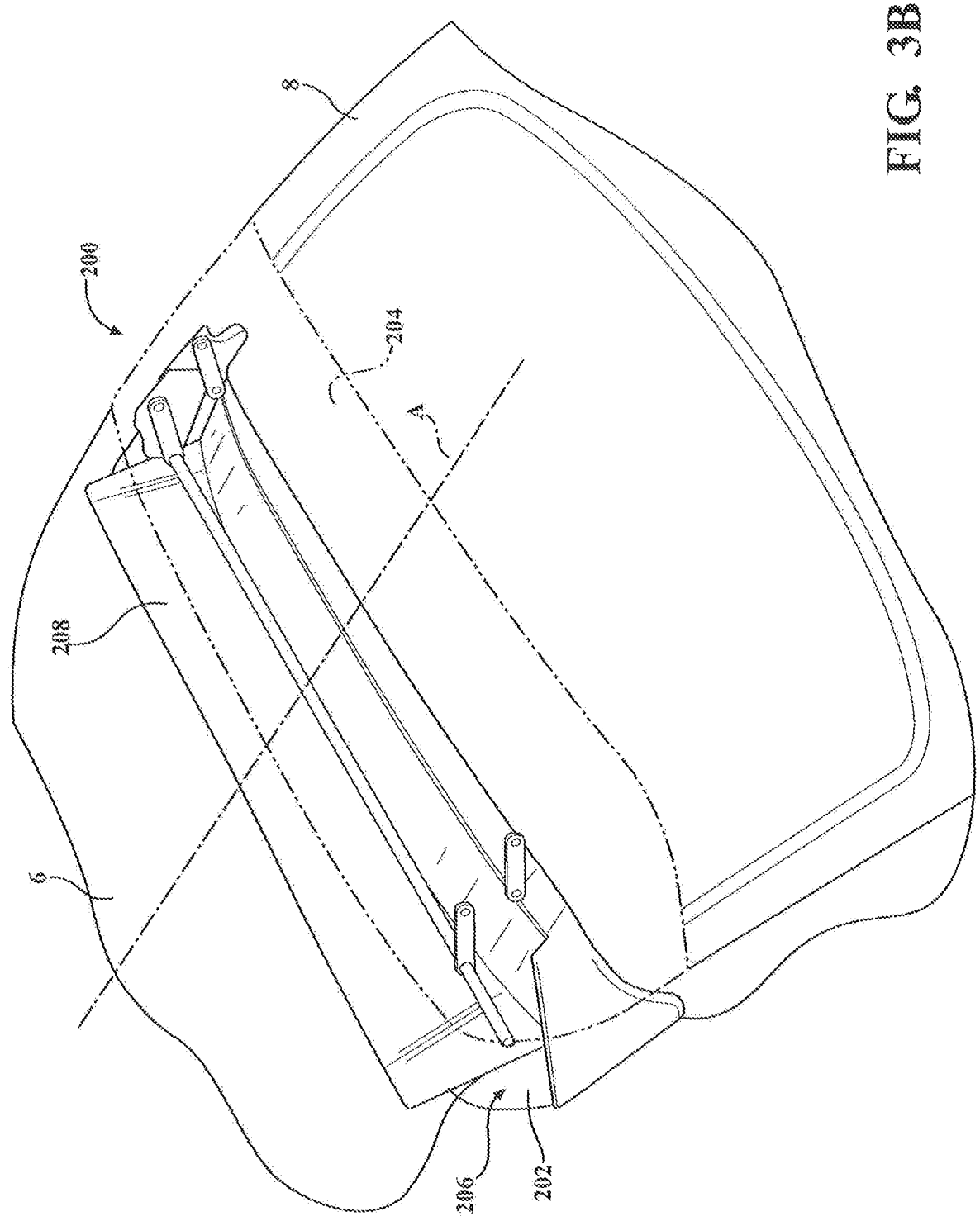
FIG. 3B is an overhead perspective view of an active liftgate spoiler having an active vertical spoiler shown in the deployed position according to the third embodiment of the invention.

FIGS. 3A and 3B are an overhead perspective views of an active liftgate spoiler 200 according to a third embodiment of the invention. In this embodiment of the invention there is a housing 202 with a horizontally moving panel 204 connected to the housing 202. Within the housing is a vertical cavity 206 that houses a vertically moving panel 208 moves between the stowed position, where the vertically moving panel 208 is completely within the vertical cavity 206 and the deployed position where the vertically moving panel 208 extends outward from the vertical cavity 206 away from the housing 202. The vertically moving panel 208 is also able to move to an intermediate position that is between the stowed position in the deployed position.

The horizontal moveable panel 204 is moveable in a longitudinal direction away from the liftgate 8 parallel to the longitudinal axis A of the vehicle 6. The horizontal moveable panel 204 is moveable between a stowed position where the vertical cavity 206 is covered and a deployed position where the vertical cavity 206 is uncovered allowing the vertical moving panel 204 to move from the stowed position to the intermediate position and the deployed position. The movement of the horizontal panel 204 is accomplished using two four bar linkages 210, 210' is connected between the horizontal moveable panel 204 and the housing 202 for moving the horizontal moveable panel 204 between the stowed position, intermediate position and the deployed position.

The horizontal moveable panel 204 moves by the movement of an actuator 212, which is a bi-directional rotary actuator that is connected to the four bar linkage 212, 212'. The four bar linkage 212, 212' has a drive shaft 222, which is connected to a driven link 224, 224' connected at one end to the drive shaft 222 and at a second end to the horizontal moveable panel 204. There is also a follower link 226, 226' that connects at a first end to the housing 202, and at a second end the follower link 226, 226' is connected to the horizontal moveable panel 204. The four bar linkage 212, 212' allows the horizontal moveable panel 204 to be moved between the stowed position, deployed position and an intermediate position between the stowed position and the deployed position. In some applications it is possible for there to be more than one intermediate position, since the actuator 212 can rotate and stop the drive shaft 222 at many different positions. To move between positions the actuator 212 rotates the drive shaft 222 in a first direction until it reaches a desired intermediate position or the deployed position. Then the actuator 212 is rotated in a second direction opposite the first direction to move the horizontal moveable panel 204 from the deployed position or intermediate position, back to the stowed position.

Figure 4A:
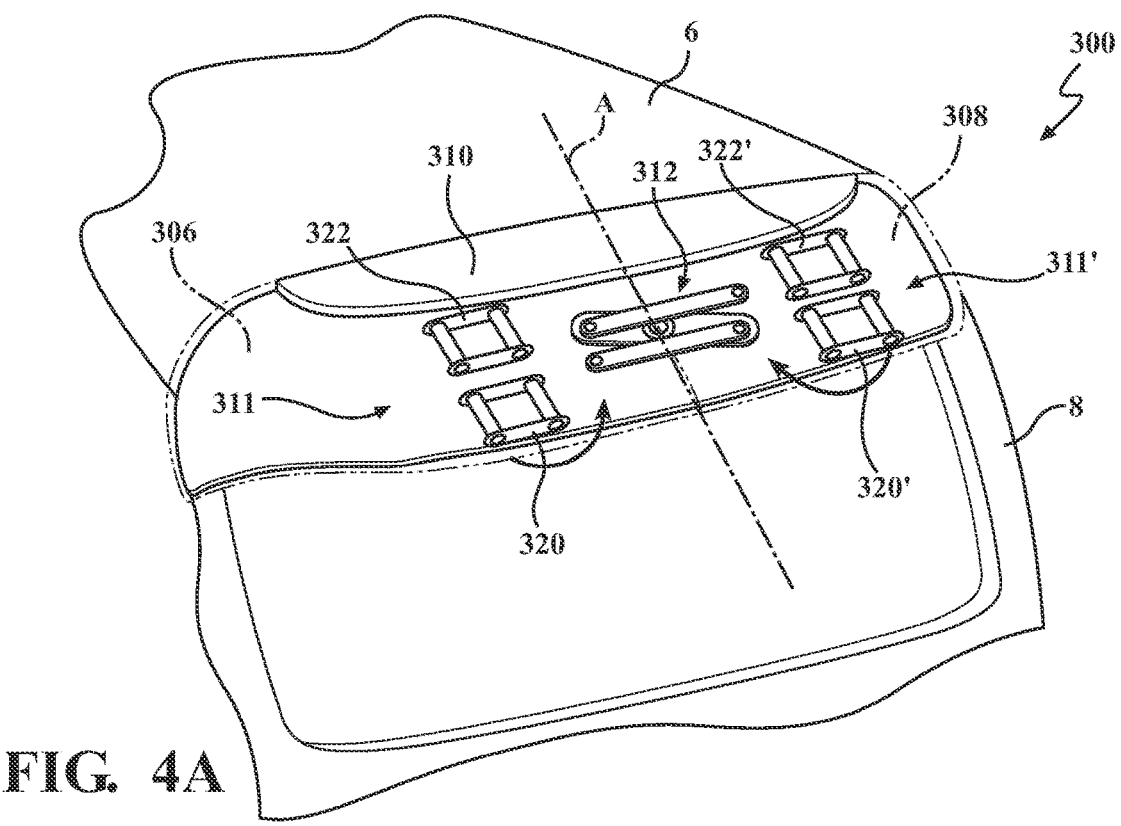
FIG. 4A is an overhead perspective view of an active liftgate spoiler having a split upper tray with linkage in the stowed position according to a fourth embodiment of the invention.
Figure 4B:
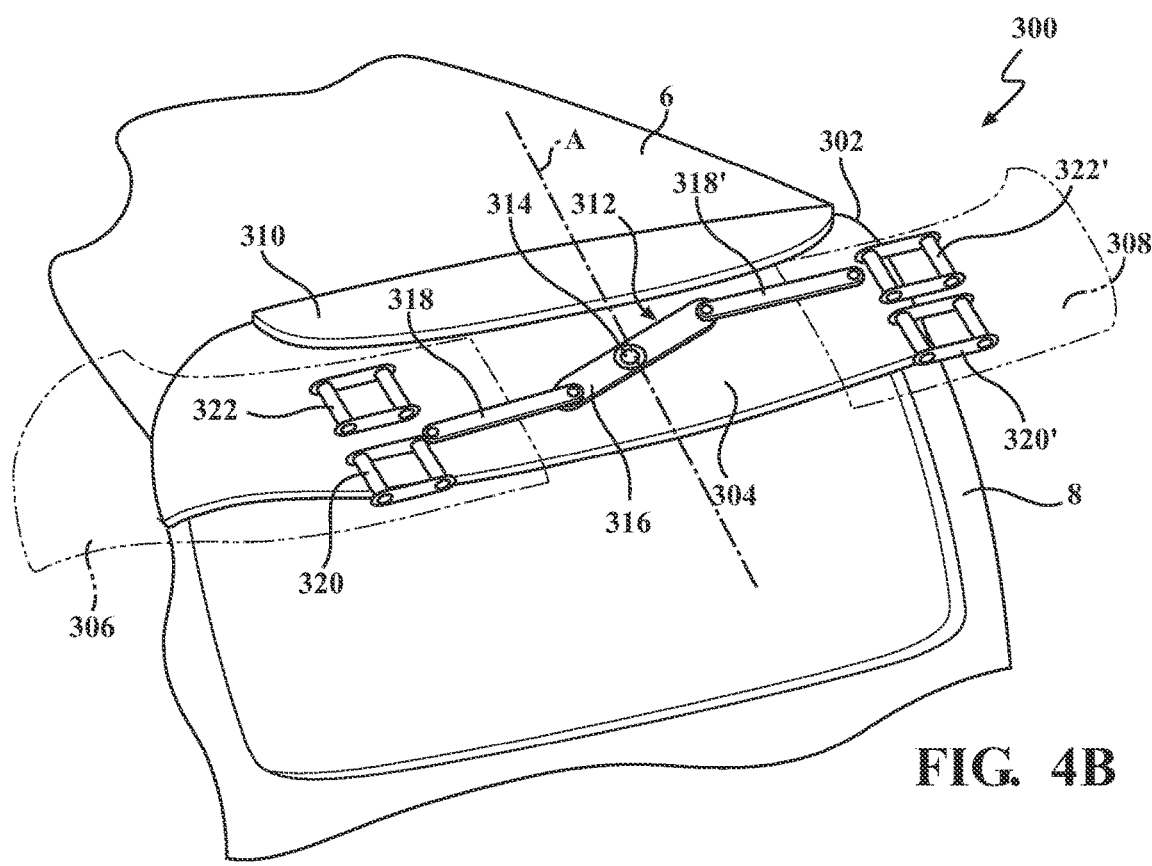
FIG. 4B is an overhead perspective view of an active liftgate spoiler having a split upper tray with linkage in the deployed position according to a fourth embodiment of the invention.

FIGS. 4A and 4B are overhead perspective views of an active liftgate spoiler 300 according to a third embodiment of the invention. There is a lower housing 302 with a mating surface 304 and an external surface portion 310. Above the lower housing 302 is an upper tray having a left panel 306 and a right panel 308 that move between a stowed position and deployed position. When in the stowed position the left panel 306 and right panel 308 abut one another and the external surface portion 310 forming a uniform exterior surface. When the portions of the upper tray are moved to the deployed position the left panel 306 and right panel 308 move away from each other along an axis that is lateral to the longitudinal axis A of the vehicle 6 and to the sides of the liftgate 8. There is also an intermediate position that is between the stowed position and the deployed position. The movement of the left panel 306 and right panel 308 is facilitated by a motor link 312 connected to an actuator 314 and a four bar linkage 311, 311'. The motor link 312 has a drive link 316 that is connected to the actuator 314 and is rotatable. Connected at opposing ends of the drive link 316 are drive link connection rods 318, 318' that connect to the bottom surface of the respective left panel 306 and right panel 308. The left panel 306 and right panel 308 each have the respective four bar link 311, 311' that include two carrier arms 320, 320', 322, 322' that connect between the bottom surface of the respective left panel 306 or right panel 308 and the lower housing 302. The carrier arms 320, 320', 322, 322' rotate the respective left panel 306 and right panel 308 about the connection with the lower housing 302 between the stowed position and a deployed position when the actuator 314 rotates the drive link 316 to an extended position or to a retracted position.

Figure 5A:
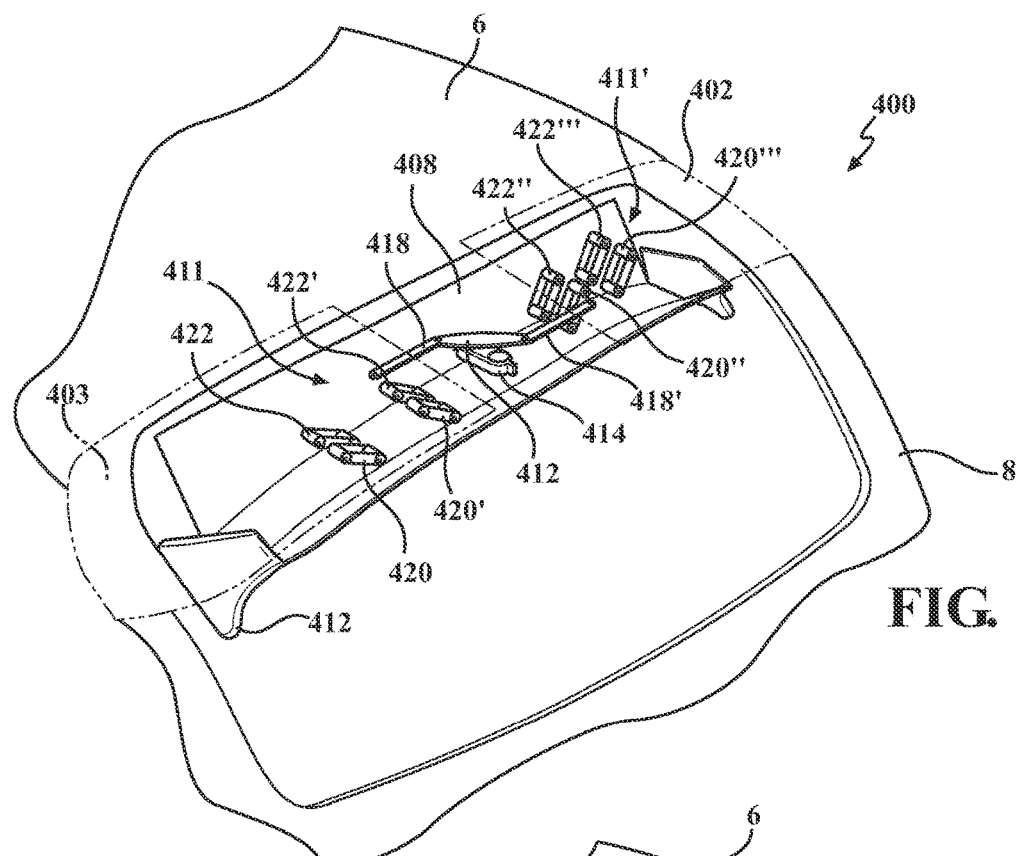
FIG. 5A is an overhead perspective view of an active liftgate spoiler having a split upper tray and vertically moving panel in the partially deployed position according to a fifth embodiment of the invention.
Figure 5B:
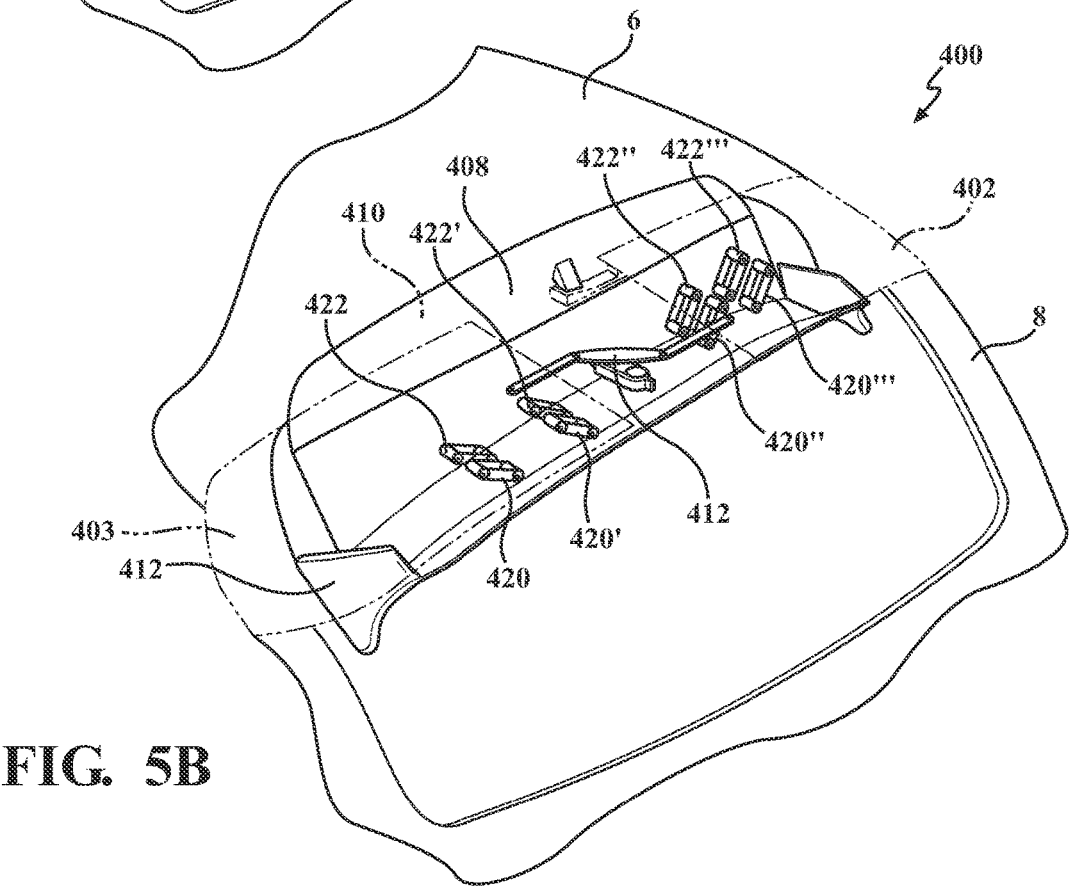
FIG. 5B is an overhead perspective view of an active liftgate spoiler having a split upper tray and vertically moving panel in the deployed position according to a fifth embodiment of the invention.

FIGS. 5A and 5B show a variation of the embodiments shown in FIGS. 3A, 3B, 4A and 4B by depicting a hybrid active liftgate spoiler 400 having horizontally moving panels in the form of a left panel 403 and right panel 402 split upper tray and vertically moving panel 408. The vertically moving panel is located in a vertical cavity 410 of a housing 412. The vertically moving panel 408 moves between the stowed position, where the vertically moving panel 408 is completely within the vertical cavity 410 and the deployed position where the vertically moving panel 408 extends outward from the vertical cavity 410 away from the housing 409. The vertically moving panel 408 is also able to move to an intermediate position that is between the stowed position in the deployed position.

The left panel 403 and a right panel 402 move between a stowed position, where the left panel 403 and right panel 402 abut and form a uniform exterior surface. When the portions of the upper tray are moved to the deployed position the left panel 403 and right panel 402 move away from each other along an axis that is lateral to the longitudinal axis A of the vehicle 6 having a liftgate 8. There is also an intermediate position that is between the stowed position and the deployed position. The movement of the left panel 403 and right panel 402 is facilitated by a motor link 412 connected to an actuator 414 and a four bar linkage 411, 411'. The motor link 412 has a drive link 416 that is connected to the actuator 414 and is rotatable. Connected at opposing ends of the drive link 414 are drive link connection rods 418, 418' that connect to the bottom surface of the respective left panel 403 and right panel 402. The left panel 403 and right panel 402 each have the respective four bar link 411, 411' that includes two carrier arms 420, 420', 420'', 420''', 422, 422', 422'', 422''' that connect between the bottom surface of the respective left panel 306 or right panel 308 and the lower housing 302. The carrier arms 420, 420', 420'', 420''' 422, 422', 422'', 422''' rotate the respective left panel 403 and right panel 402 about the connection with the lower housing 409 between the stowed position and a deployed position when the actuator 414 rotates the drive link 416 to an extended position or to a retracted position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active liftgate spoiler comprising;
   a liftgate of a vehicle, the liftgate includes an upper surface;
   a housing connected to the upper surface of the liftgate;
   a moveable panel connected to the housing by a connection, the moveable panel being moveable between a stowed position, an intermediate position and a deployed position;
   at least one four bar linkage creating at least a portion of the connection between the moveable panel and the housing;
   an opening in the housing for slidably receiving the moveable panel; and
   a hollow cavity connected to the opening of the housing, wherein the moveable panel is contained within the hollow cavity when in the stowed position and extends through the opening so that the moveable panel extends away from the housing when moved to the intermediate position and the deployed position.

2. The active liftgate spoiler of claim 1 further comprising:
   an actuator connected to the least one four bar linkage for moving the moveable panel between the stowed position, the intermediate position and the deployed position.

3. The active liftgate spoiler of claim 2 further comprising:
   a drive shaft connected between the actuator and the at least one four bar linkage for rotating the four bar linkage and the moveable panel between the stowed position, the intermediate position and the deployed position;
   wherein the at least one four bar linkage further includes a driven link rotatably connected at one end to the drive shaft and at a second end to the moveable panel; and
   a follower link rotatably connected between the housing and the moveable panel.

4. The active liftgate spoiler of claim 1 wherein the opening in the housing faces outward and rearward from the liftgate such that the moveable panel extends away from the liftgate along a longitudinal axis of the vehicle when the moveable panel is in the deployed position.

5. The active liftgate spoiler of claim 1 wherein the moveable panel is a vertically moving panel located in a vertical cavity of the housing and the vertically moving panel moves between a stowed position, an intermediate position and a deployed position, where the vertically moving panel is completely within the vertical cavity when in the stowed position and when in the deployed position the vertically moving panel extends outward from the vertical cavity away from housing and when the vertically moving panel is in the intermediate position, the vertically moving panel is at a position between the stowed position and the deployed position.

6. The active liftgate spoiler of claim 5 further comprising a horizontal moveable panel that is moveable in a longitudinal direction away from the rear liftgate parallel to a longitudinal axis of the vehicle, such that the horizontal moveable panel is moveable between a stowed position where an aperture of the vertical cavity is covered and a deployed position where the aperture of the vertical cavity is uncovered allowing the vertical moving panel to move from the stowed position to the intermediate position and the deployed position.

7. The active liftgate spoiler of claim 5 further comprising a second moveable panel that is an upper tray including a left side panel and a right side panel that move between a stowed position where the left panel and right panel abut and form a uniform exterior surface, a deployed position where the left panel and right panel move away from each other along an axis that is lateral to a longitudinal axis of the vehicle and an intermediate position between the stowed position and the deployed position.

8. The active liftgate spoiler of claim 1 further comprising:
the moveable panel is an upper tray connected to a mating surface on a lower housing of the active liftgate spoiler, wherein the upper tray moves between the stowed position where the upper tray is seated against the mating surface of the lower housing, the deployed position where the upper tray extends away from the lower housing and the intermediate position between the stowed position and the deployed position.

9. The active liftgate spoiler of claim 8 further comprising an actuator connected to the four bar linkage for moving the upper tray between the stowed position, the intermediate position and the deployed position.

10. The active liftgate spoiler of claim 8 wherein the upper tray extends away from the liftgate along a longitudinal axis of the vehicle when moved to the deployed position.

11. The active liftgate spoiler of claim 8 wherein the upper tray is formed of a left panel and a right panel that move between a stowed position where the left panel and right panel abut and form a uniform exterior surface, a deployed position where the left panel and right panel move away from each other along an axis that is lateral to a longitudinal axis of the vehicle and an intermediate position between the stowed position and the deployed position.

12. An active liftgate spoiler comprising:
a liftgate of a vehicle, the liftgate includes an upper surface;
a housing connected to the upper surface of the liftgate;
a moveable panel connected to the housing by a connection, the moveable panel being moveable between a stowed position, an intermediate position and a deployed position;
at least one four bar linkage creating at least a portion of the connection between the moveable panel and the housing;
an opening in the housing that faces outward and rearward from the liftgate for slidably receiving the moveable panel;
a hollow cavity connected to the opening of the housing, wherein the moveable panel is contained within the hollow cavity when in the stowed position and extends through the opening so that the moveable panel extends away from the housing and away from the liftgate along a longitudinal axis of the vehicle when the moveable panel is moved to the intermediate position and the deployed position.

13. The active liftgate spoiler of claim 12 further comprising:
an actuator connected to the least one four bar linkage for moving the moveable panel between the stowed position, the intermediate position and the deployed position.

14. The active liftgate spoiler of claim 13 further comprising:
a drive shaft connected between the actuator and the at least one four bar linkage for rotating the four bar linkage and the moveable panel between the stowed position, the intermediate position and the deployed position;
wherein the at least one four bar linkage further includes a driven link rotatably connected at one end to the drive shaft and at a second end to the moveable panel; and
a follower link rotatably connected between the housing and the moveable panel.

15. An active liftgate spoiler comprising:
a liftgate of a vehicle, the liftgate includes an upper surface;
a housing connected to the upper surface of the liftgate;
a vertically moving panel located in a vertical cavity of the housing and the vertically moving panel moves between a stowed position, where the vertically moving panel is completely within the vertical cavity, a deployed position where the vertically moving panel extends outward from the vertical cavity away from housing and an intermediate position between the stowed position and the deployed position;
a horizontal moveable panel that is an upper tray including a left side panel and a right side panel that move between a stowed position where the left panel and right panel abut and form a uniform exterior surface, a deployed position where the left panel and right panel move away from each other along an axis that is lateral to a longitudinal axis of the vehicle and an intermediate position between the stowed position and the deployed position; and
at least one four bar linkage connected between the horizontal moveable panel and the housing for moving the horizontal moveable panel the stowed position, intermediate position and the deployed position.

16. The active liftgate spoiler of claim 15 further comprising:
an actuator connected to the least one four bar linkage for moving the horizontal moveable panel between the stowed position, the intermediate position and the deployed position.

17. The active liftgate spoiler of claim 16 further comprising:
a drive shaft connected between the actuator and the at least one four bar linkage for rotating the four bar linkage and the horizontal moveable panel between the stowed position, the intermediate position and the deployed position;

wherein the at least one four bar linkage further includes a driven link rotatably connected at one end to the drive shaft and at a second end to the horizontal moveable panel; and a follower link rotatably connected between the housing and the horizontal moveable panel.

* * * * *